US 6,641,502 B2

(12) United States Patent
Heim

(10) Patent No.: US 6,641,502 B2
(45) Date of Patent: Nov. 4, 2003

(54) APPARATUS FOR CONTROLLING A MOTOR VEHICLE TRANSMISSION

(75) Inventor: Udo Heim, Leonberg (DE)

(73) Assignee: Dr. Ing. h.c.F. Porsche AG, Stuttgart (DE)

(*) Notice: Subject to any disclaimer, the term of this patent is extended or adjusted under 35 U.S.C. 154(b) by 0 days.

(21) Appl. No.: 09/982,990

(22) Filed: Oct. 22, 2001

(65) Prior Publication Data
US 2002/0058566 A1 May 16, 2002

(30) Foreign Application Priority Data
Oct. 20, 2000 (DE) .......................... 100 52 881

(51) Int. Cl.⁷ .................. B60K 41/12; F16H 61/40; G06F 17/00; G06F 19/00; G06F 7/00
(52) U.S. Cl. .............. 477/37; 477/46; 477/68; 701/52; 701/56
(58) Field of Search ............. 477/37, 46, 68, 477/41, 43; 701/52, 53, 56, 59, 54, 64, 65, 66, 36, 57, 24

(56) References Cited

U.S. PATENT DOCUMENTS

| | | | | |
|---|---|---|---|---|
| 4,862,363 A | * | 8/1989 | Krisher et al. | 701/59 |
| 5,031,100 A | | 7/1991 | Takahashi | 364/424.1 |
| 5,101,926 A | * | 4/1992 | Berman et al. | 180/272 |
| 5,285,389 A | * | 2/1994 | Taylor | 701/51 |
| 5,467,277 A | * | 11/1995 | Fujisawa et al. | 701/51 |
| 5,878,364 A | * | 3/1999 | Kuroda et al. | 701/56 |
| 6,086,506 A | * | 7/2000 | Petersmann et al. | 477/45 |
| 6,098,005 A | * | 8/2000 | Tsukamoto et al. | 701/65 |
| 6,311,114 B1 | * | 10/2001 | Graf et al. | 701/57 |

FOREIGN PATENT DOCUMENTS

| | | |
|---|---|---|
| DE | 3922051 | 1/1991 |
| DE | 4033574 A1 | 5/1991 |
| DE | 412540 | 11/1992 |
| DE | 43 05 903 | 9/1994 |
| DE | 44 45 574 | 7/1995 |
| DE | 197 38 614 | 3/1998 |
| DE | 19637209 A1 | 4/1998 |
| DE | 19752623 | 10/1999 |
| EP | 766024 A2 | 4/1997 |

* cited by examiner

Primary Examiner—Sherry Estremsky
Assistant Examiner—Tisha D. Lewis
(74) Attorney, Agent, or Firm—Crowell & Moring LLP

(57) ABSTRACT

A control device for a gear of a motor vehicle, where the control device adjusts the speeds or transmissions of a gear according to a control program. In order to improve the setting of options and parameters to influence the control program, it is proposed that a memory be provided in the control device in which the options or parameters to influence the control program are filed in an alterable manner. An input device is connected with the memory and that input device can access the memory in a writing fashion. It is thus possible to set or alter options or parameters to influence the control program via the input device.

12 Claims, 1 Drawing Sheet

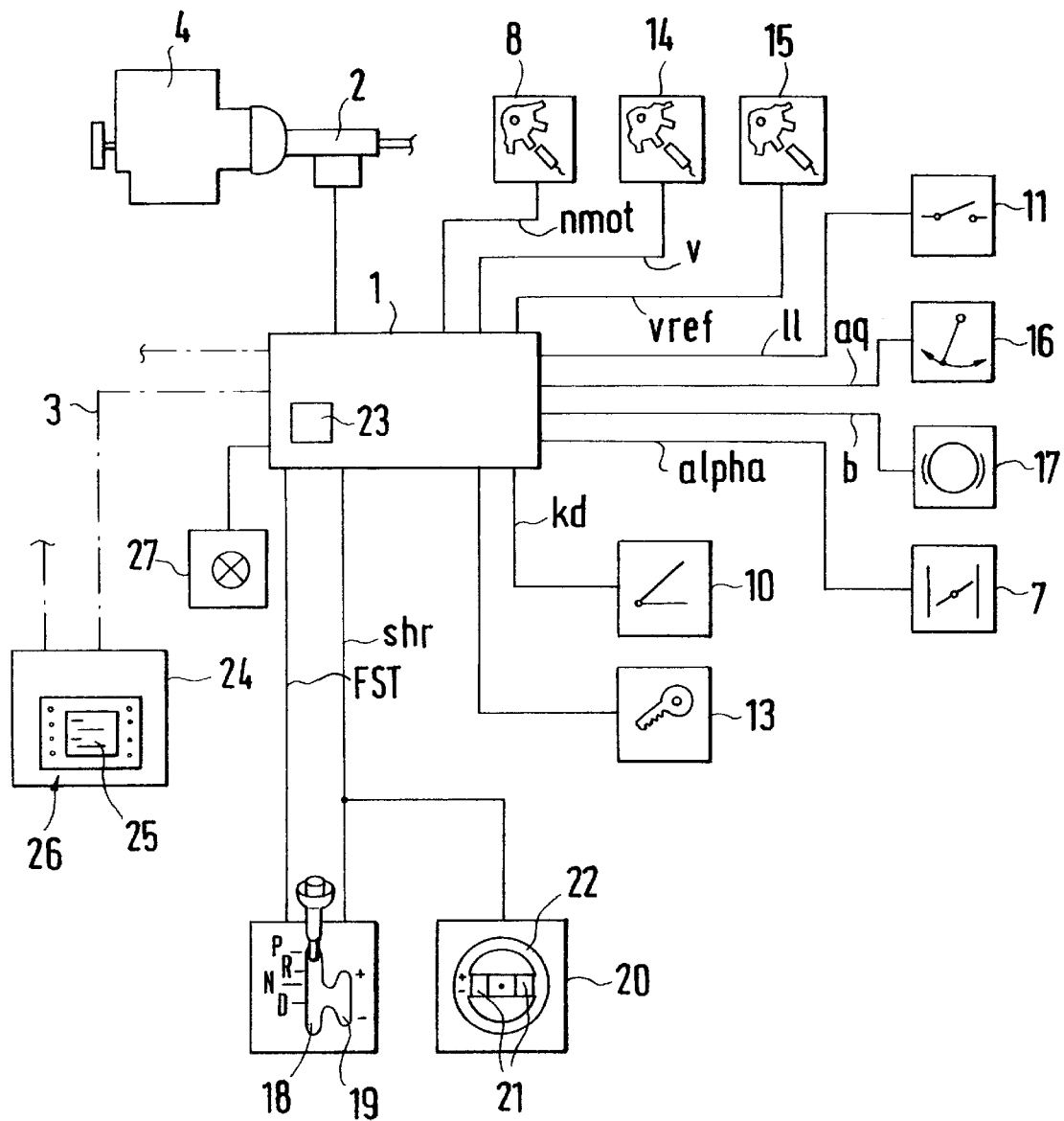

APPARATUS FOR CONTROLLING A MOTOR VEHICLE TRANSMISSION

This application claims the priority of German Patent Document 100 52 881.3, filed Oct. 20, 2000, the disclosure of which is expressly incorporated by reference herein.

BACKGROUND AND SUMMARY OF THE INVENTION

This invention relates to a control device for a gear of a motor vehicle, where the control device sets the speeds or transmissions of the gear according to a control program.

Gears with such a control device are usually referred to as automatic gears. The gears thus used can be based on various designs. Most widespread are so-called step automats that in structural terms have a fixed number of speeds (=transmission steps). Then there are also infinitely variable change-speed gears whose transmission basically can be set freely. German Patent DE 41 20 540 C1 discloses that one can provide transmission in order thus to replicate a multi-step reduction gear for infinitely variable change-speed gears.

Regardless of the gear model, one may provide that the gears are operated in an automatic operating mode or in a manual operating mode influenced by the driver. In the automatic operating mode, a control program, running in the control device according to operating parameters of the motor vehicle, automatically selects the gears or transmissions of the gear. In the manual operating mode, on the other hand, the driver via an operating device, such as, for example, a switching lever or a switching rocker placed on the steering wheel, has direct access to the various speeds or transmissions of the gear. In the manual operating mode, however, one can trigger switching operations automatically if, for example, the operating range of the driving motor is left or is a kickdown which is activated. Additionally, certain switching programs can be selected for the automatic operating mode such as, for example, a sports program or a winter program. Such selection possibilities here are referred to as options or parameters to influence the control program.

The object of the invention is to improve the adjustment of options or parameters used to influence the control program.

According to the present invention, a memory is provided in the control device in which the options or parameters to influence the control program are filed in an alterable manner. Connected to the memory is an input device that can access the memory in a writing fashion. It is thus possible via the input device to set or alter options or parameters to influence the control program. An input device is accessible to the driver so that these parameters or options for influencing the control program can at any time, although not necessarily during the current operation of the motor vehicle, be changed. The driver advantageously thus has simple access to the setting of the gear and in this way can adapt the performance of the gear to his personal wishes without having to go to a shop or the like.

The present invention has an on-board computer or a navigation system, possibly also a radio or an air conditioning control device to be used as an input device. By using input resources already present in the motor vehicle, one does not need any additional input devices so that the structural effort is diminished.

According to another aspect of the present an input device is operable via an operating device to select a speed or a transmission of the gear. Such operating device, for example, is a switching lever or preferably a switching rocker placed on the steering wheel. This results in a meaningful operation of the input device because, by using an operating device associated with the gear, one can clearly recognize that the input device—otherwise needed for other purposes—can be used to influence the control device for the gear.

The connection between the input device and the control device should preferably be accomplished via a data bus, for example, a CAN-Bus. Such a data bus is already provided in modern vehicles so that there is no need for any additional lines to connect the input device with the control device.

Inputs via the input device are permitted only if it has been recognized that the motor vehicle is at a standstill. This is checked by determining whether the driving speed is zero and whether a parking position has been set on the gear. In that way, the driver or a passenger can be prevented from accidentally changing the parameters or options during the ongoing operation of the motor vehicle. In particular, by checking the parking position of the gear, it can be ensured that the motor vehicle is not just in a standstill position due to traffic conditions.

An additional safety against accidental changes in the options or parameters can be achieved by updating of the memory. That is to say, inputs or changes via the input device into the memory, can be considered only if the motor vehicle or a combustion engine driving the gear was started over again. As a result, it is no longer possible during current operation to change the options or parameters and, as a result of the necessary renewed start, the driver can clearly see that this is a continuing interference in the performance of the control device and thus the behavior of the gear.

In particular, the following options or parameters are set:

if the gear is an infinitely variable change-speed gear and if the control program replicates a step gear, then as option, it should be possible to set the type of the replicated gear and/or the number of speeds of that replicated gear. The type of the gear, for example, can be an economy gear (with a maximum speed designed to be long) or a sport gear (maximum speed is attained during the highest gear). The number of speeds of the replicated gear should preferably be between 5 and 10.

the performance should be selectable when a combustion engine driving the gear has reached its upper rpm. Preferably, an automatic switchover of the gear upon reaching the upper rpm limit is possible. This setting is effective only in the operating mode influenced by the driver.

the performance of the gear during the activation of a kickdown switch is be selectable. The following are considered as options to be selected: ineffective; switchback into the smallest speed permissible during current operating conditions; switchback by one gear. When the last-mentioned option is chosen, the kickdown switch performs the same function as an operating device of the gear to trigger a switchback.

By virtue of the adjustability of various options or parameters, one may encounter the following problem: The driver will not recognize which options or parameters have just been chosen. The following measures are proposed for this purpose.

After a predetermined standstill time of the motor vehicle, a predetermined standard set of options or parameters is set. The standstill time, however, is preferably so chosen that this will involve more than a brief interruption in driving. In that way, one can make sure that, if the motor vehicle is placed in operation again, the gear will be in a defined basic state. This basic state, determined in the standard set, should be preferably so chosen that options and parameters are picked that ensure safe operation of the motor vehicle. This means for example, for the abovementioned options:

gear type=six-speed sport gear, automatic increase upon reaching the upper rpm limit= turned on, activation of kickdown switch=switchback into the smallest permissible speed.

To be able to use the input device, one must also provide a display device for the options and parameters that have just been formed. It is proposed that such a display device or some other display device independent of the input device is always activated when the motor vehicle is placed in operation in order to make it clear to the driver which options and parameters have been chosen. To provide safety against unintentional startup, a handshake device can be provided to help activate the display options and parameters. If this handshake device is not activated, then one sets a predetermined basic setting for the options and parameters. The handshake device can, in particular, be the operating device for the selection of a speed or a transmission and the activation of the former for handshake purposes must differ from the usual activation to prevent accidental handshake. If, by way of example, switching rockers are provided on the steering wheel as activation device, then for handshake purposes, it is necessary to activate both switching rockers simultaneously.

The following is proposed as a further development of the invention: Several memory areas are provided in the memory and these memory areas can be selected by an additional selection device. These memory areas preferably can be matched up with certain drivers if a motor vehicle already contains a possibility for identifying the driver (coded key, dialing switch or the like). In this way, assuming the driver has been identified, the gear will be operated with the options and parameters chosen by that driver. If the driver is not identified, then the gear will reliably be operated with the options and parameters set in the standard set.

Additional options and parameters can also be provided for the automatic operating mode of the gear. In the case of control devices, where, as revealed, for example, in DE 39 22 051 A1, several sets of matchups of speeds or transmissions of operating parameters are provided (that is to say, several switching identification fields or regulation identification fields), one may, for example, in place of the automatic selection of the set of matchups, optionally provide option that a set of matchups be firmly adjustable through the driver. It is also possible to select a set of matchups usually not provided, that is to say, a special switching program. Such a switching program, for example, can be a winter program or a program for trailer operation.

The display device can also be so fashioned that in case of a deviation from the standard settings, the driver constantly gets a hint, for example, through a control lamp in the instrumentation area.

BREIF DESCRIPTION OF THE DRAWINGS

The sole FIGURE details a control device of the present invention.

The invention is described in greater detail with reference to the exemplary embodiment illustrated in the FIGURE.

DETAILED DESCRIPTON OF THE PREFERRED EMBODIMENT

The only FIGURE presents an overview of a control device 1 of a gear 2 of a motor vehicle, not shown in any greater detail, with a combustion engine 4. A control program is executed in control device 1; on the basis of the operating magnitudes of the motor vehicle supplied to control device 1, said control device 1 determines signals to control gear 2. Control device 1 is connected via a data bus, in this case a CAN-Bus 3, with other control devices, including an on-board computer 24.

Magnitudes or functions that change with time t are illustrated below as functions f(t) of time t.

Control device 1, at least as a function of the choke valve position alpha(t) of a choke valve angle transmitter 7 and a motor rpm nmot(t) of a motor rpm transmitter 8 of combustion engine 4, selects gear 2. As additional input magnitudes, control device 1 receives a kickdown signal kd(t) from a kickdown switch 10, an idling signal ll(t) from an idling switch 11 and a driving speed signal v(t) from a driving speed transmitter 14. In addition, control device 1 acquires and processes a speed from vref(t) from a reference speed transmitter 15 to an unpowered vehicle axle, a cross-acceleration aq(t) from a cross-acceleration transmitter 16 and a braking signal from a braking signal transmitter 17.

Finally, the control is influenced by the driver via a selection device 18 for the preselection of driving steps P (parking lock), R (reverse gear step), N (idling gear step) and D (automatic setting of the transmission ratio of the infinitely variable change-speed gear.

Selection device 18 can be moved out of driving step D in which the first automatic operating mode is selected into a second speed range gear step 19 in which the second manual operating mode is selected and in which the driver, via selection device 18 can influence the transmission ratio in terms of a increase or decrease. The selection device 18 transmits a driving step signal FST and a switching requirement signal shr for an increase or decrease. A second selection device 20 consists of two rocker switches 21 that are placed on a steering wheel 22. Rocker switches 21 also generate a switching requirement signal shr.

The term "increase" or "decrease of transmission" represents a change in the transmission that, with constant input rpm, increases the output rpm of the gear. Conversely, the terms "switchback" or "increasing the transmission" represent a transmission change in terms of a reduction of the output rpm of the gear with constant input rpm.

Control device 1 is a memory programmable control device in which a control program runs during operation. A memory area 23, provided in control device 1, contains parameters and options that are used during the execution of the control program and that serve to influence the control program. The control program is influenced in the following manner.

"Speed number" parameter: This parameter determines the number of transmissions or speeds to be replicated in gear 2 in the operating mode influenced by the driver.

"Gear type" parameter: Via this parameter one selects as gear type either an economy gear or a sport gear. In case of the economy gear, the maximum speed is designed long; the maximum speed of the vehicle is not reached in this gear and, on upgrades, it will be necessary to switch back. In a sport gear, on the other hand, the maximum speed is so designed that the maximum speed of the motor vehicle will be reached.

With the help of the "speed number" and "gear type" parameters, the control program selects a set of preadjusted transmissions to operate gear 2.

"Manual kickdown" parameter: This parameter can accept the values "ineffective" or "kickdown" or "switchback."

The processing of the kickdown signal kd(t) is controlled via this parameter in the operating mode influenced by the driver. If the option has been set to the value "ineffective," then there is no processing. If the option has been set to the value "kickdown," then gear 2, in response to a kickdown signal kd(t), switches to the slowest possible speed at which the combustion engine 4 has not yet reached its upper rpm limit. If the "switchback" value has been chosen for the option, then in response to a kickdown signal kd(t), a switchback is performed. In this case, the kickdown signal kd(t) has the same effect as the switching requirement signal shr for a switchback. Multiple activation of kickdown switch 10 also leads to multiple switchbacks as long as combustion engine 4 does not exceed its upper rpm limit due to switchback.

"Automatic increase" option: If this option is active, then control device 1—also in the operating mode influenced by the driver—automatically performs an increase even if combustion engine 4 has reached its upper rpm limit.

Memory 23 is connected to CAN-Bus 3 with an input device, in this case an on-board computer 24, provided with display 25 and keys 26. On the condition that the driving speed v(t) is on a value of zero and additionally that the driving step signal FST displays the value P, the on-board computer 24 can be used to call up a selection mask for specifically driver-tailored adjustments of the gear. The current values for the above-described parameters and options can be displayed in display 25. Individual parameters and options can be called up and changed via keys 26.

When calling up the point "specifically driver-oriented settings," the on-board computer 24 via CAN-Bus 3 requests the current values of the parameters and options from control device 1. Control device 1 reads these values out of memory 23 and puts them out via the CAN-Bus. Upon every initialization of control device 1, that is to say, upon every fresh start of combustion engine 4, the standard set of parameters and options is chosen first of all. At the same time, control device 1 via CAN-Bus 3 requests the values of the parameters and options stored in the on-board computer 24. If control device 1 does not receive any valid values from onboard computer 24, then one uses the standard set of parameters and options that are permitted by the safe operation of the motor vehicle. In the case at hand, the following are filed as standard values:

speed number=6,
gear type=sport gear,
manual kickdown=off,
automatic increase=on.

The current values of the parameters and options are basically updated in control device 1 only if selection device 18 is in position P.

The moment the point of "specifically driver-oriented adjustments" is retained in on-board computer 24, the values for the parameters and options are permanently stored in on-board computer 24.

An alert lamp 27 in the field of vision of the driver is preferably placed in the area of other display devices such as, for example, an rpm meter. Control device 1 turns on control lamp 27 if the values for the parameters and options of the control program deviate from the values given in control device 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A control device for a transmission of a motor vehicle, for adjusting gears or gear ratios of the transmission based on a determination of a control program, said control device comprising:

a first device for providing an automatic operating mode;

a second device for providing a manual operating mode that is influenced by the driver;

a memory for variably storing at least one of options and parameters for influencing the control program; and a display device for displaying said at least one of options and parameters, wherein the transmission is a continuously variable transmission, wherein the control program duplicates a stepped transmission to provide a duplicated transmission and, as an option in the memory, at least one of the following settings for the manual operating mode is selected:

a type of duplicated transmission, a number of gears of the duplicated transmission, a first behavior of the transmission when an internal combustion engine driving the transmission has reached its upper speed limit, a second behavior of the transmission when a kickdown switch is actuated.

2. The control device according to claim 1, wherein one of an onboard computer, a navigation system, a radio and a climate control device, respectively with display and operating elements as well as keys, is provided as an input device and said display device.

3. The control device according to claim 1, further includes an input device which is an operating device for selecting a gear or a gear ratio of a transmission.

4. The control device according to claim 1, further including a data bus for connection with an input device.

5. The control device according to claim 2, wherein an input from the input device is possible only while the motor vehicle is stopped, wherein a standstill is recognized when the driving speed is essentially zero and a parking position of the transmission has been selected.

6. The control according to claim 1, wherein the memory is only effectively updated when an internal combustion engine driving the transmission has been newly started.

7. The control according to claim 1, wherein specified options are selected upon renewed start-up after a predetermined standstill period of the motor vehicle.

8. The control according to claim 1, wherein the display device is activated at least upon start-up of the motor vehicle and that a verification device is provided, via which the displayed options or parameters can be confirmed.

9. The control according to claim 8, wherein the verification device is an operating device for selecting a gear or a gear ratio of a transmission.

10. The control according to claim 1, wherein the memory comprises a plurality of memory areas, which can be selected via a selection device that is included in addition to the input device.

11. The control according to claim 1, wherein the control program in the automatic operating mode automatically adjusts gears or gear ratios based on the specification of operating parameters of the motor vehicle, wherein a plurality of sets of allocations of gears or gear ratios based on the operating parameters are provided and as an option in the memory a set of allocations of gears or gear ratios to the operating parameters can be selected.

12. The control according to claim 1, wherein the control program in the automatic operating mode automatically adjusts gears or gear ratios based on the specification of operating parameters of the motor vehicle, wherein one or more sets of allocations of gears or gear ratios based on the operating parameters are provided and as an option in the memory an additional set of allocations of gears or gear ratios to the operating parameters can be selected.

* * * * *